(12) United States Patent
Mineta

(10) Patent No.: US 9,046,379 B2
(45) Date of Patent: Jun. 2, 2015

(54) DEVICES AND METHODS FOR DETERMINING FUEL CONSUMPTION AND SEARCHING VEHICLE ROUTES

(75) Inventor: Kenichi Mineta, Rancho Palos Verdes, CA (US)

(73) Assignee: Honda Motor Co., Ltd., Tokyo (JP)

( * ) Notice: Subject to any disclaimer, the term of this patent is extended or adjusted under 35 U.S.C. 154(b) by 433 days.

(21) Appl. No.: 12/987,267

(22) Filed: Jan. 10, 2011

(65) Prior Publication Data

US 2011/0160990 A1 Jun. 30, 2011

Related U.S. Application Data

(63) Continuation-in-part of application No. 12/648,090, filed on Dec. 28, 2009, now Pat. No. 8,793,067.

(51) Int. Cl.
*G01C 21/34* (2006.01)
*G08G 1/01* (2006.01)

(52) U.S. Cl.
CPC ........ *G01C 21/3469* (2013.01); *G01C 21/3492* (2013.01); *G08G 1/0125* (2013.01)

(58) Field of Classification Search
CPC ........... G01C 21/3469; G01C 21/3492; G08G 1/0125
USPC ............ 701/29.4, 54, 117, 123, 200, 411, 22, 701/423, 32.1; 700/38, 291; 429/251, 403, 429/410, 429; 340/439; 290/40 C; 123/348, 123/352, 435, 436, 479, 675, 684, 90.15; 180/65.265
See application file for complete search history.

(56) References Cited

U.S. PATENT DOCUMENTS

| 5,913,917 A * | 6/1999 | Murphy | 701/123 |
| 6,005,494 A | 12/1999 | Schramm | |
| 7,274,987 B2 * | 9/2007 | Ishiguro | 701/123 |

(Continued)

FOREIGN PATENT DOCUMENTS

| JP | 2278116 | 11/1990 |
| JP | 05203456 | 8/1993 |

(Continued)

OTHER PUBLICATIONS

International Search Report and Written Opinion, mailed Feb. 22, 2011, from PCT Application No. PCT/JP2010/007166.

(Continued)

*Primary Examiner* — Tuan C. To
*Assistant Examiner* — Isaac Smith
(74) *Attorney, Agent, or Firm* — Plumsea Law Group, LLC

(57) ABSTRACT

A route searching device according to an embodiment of the invention includes an estimated fuel consumption amount computing unit that computes an estimated fuel consumption amount of each interval constituting plural routes from a departure point to a destination and an optimum route selecting unit that selects a route in which a total of the estimated fuel consumption amount from the departure point to the destination is minimized. The estimated fuel consumption amount may be obtained by adding a cruise fuel consumption amount, a gradient fuel consumption amount, and a vehicle-speed fluctuation fuel consumption amount. In a further aspect, an average fuel consumption value for each speed range of an interval may be determined based on limited fuel consumption data, and fuel consumption values may be updated using measured probe data.

23 Claims, 15 Drawing Sheets

(56) References Cited

U.S. PATENT DOCUMENTS

| | | | |
|---|---|---|---|
| 7,369,938 B2 | 5/2008 | Scholl | |
| 7,512,486 B2 | 3/2009 | Needham et al. | |
| 2004/0230376 A1 | 11/2004 | Ichikawa et al. | |
| 2007/0027593 A1* | 2/2007 | Shah et al. | 701/30 |
| 2007/0255477 A1 | 11/2007 | Okuda et al. | |
| 2008/0125958 A1 | 5/2008 | Boss et al. | |
| 2008/0133120 A1 | 6/2008 | Romanick | |
| 2008/0221787 A1 | 9/2008 | Vavrus | |
| 2008/0270021 A1 | 10/2008 | Yamada | |
| 2008/0294339 A1 | 11/2008 | Tauchi et al. | |
| 2009/0254266 A1 | 10/2009 | Altrichter et al. | |
| 2010/0017110 A1 | 1/2010 | Sengoku et al. | |
| 2010/0057339 A1 | 3/2010 | Pryakhin et al. | |
| 2010/0076675 A1* | 3/2010 | Barth et al. | 701/200 |
| 2012/0029803 A1* | 2/2012 | Yasushi et al. | 701/123 |

FOREIGN PATENT DOCUMENTS

| | | | |
|---|---|---|---|
| JP | 10197272 | | 7/1998 |
| JP | 10197272 A * | | 7/1998 |
| JP | 2003166868 | | 6/2003 |
| JP | 2005017194 | | 1/2005 |
| JP | 2005098749 | | 4/2005 |
| JP | 2005172582 | | 6/2005 |
| JP | 2006003147 | | 1/2006 |
| JP | 2006098174 | | 4/2006 |
| JP | 2006098174 A * | | 4/2006 |
| JP | 2009079995 | | 4/2009 |
| JP | 2009133779 | | 6/2009 |
| JP | 2009222519 | | 10/2009 |
| JP | 2009264935 | | 11/2009 |

OTHER PUBLICATIONS

Amendment and Response filed Dec. 21, 2012 in U.S. Appl. No. 12/648,090.
Amendment filed Dec. 12, 2013 in U.S. Appl. No. 12/648,090.
Final Office Action mailed Feb. 26, 2013 in U.S. Appl. No. 12/648,090.
Notice of Allowance issued Mar. 18, 2014 in U.S. Appl. No. 12/648,090.
Office Action mailed Jul. 25, 2012 in U.S. Appl. No. 12/648,090.
Request for Continued Examination filed Jun. 27, 2013 in U.S. Appl. No. 12/648,090.
Amendment Under 37 C.F.R. § 1.114 filed Jun. 27, 2013 in U.S. Appl. No. 12/648,090.
Office Action issued Sep. 12, 2013 in U.S. Appl. No. 12/648,090.
U.S. Appl. No. 12/648,090, filed Dec. 28, 2009 (currently pending but not published).

* cited by examiner

DEVICES AND METHODS FOR DETERMINING FUEL CONSUMPTION AND SEARCHING VEHICLE ROUTES

This application is a continuation-in-part of U.S. patent application Ser. No. 12/648,090, filed Dec. 28, 2009, which is herein incorporated by reference in its entirety.

BACKGROUND OF THE INVENTION

1. Field of the Invention

The present invention relates to a route searching device of a vehicle, more particularly to a route searching device that searches a running route whose fuel consumption amount is minimized when the vehicle runs from a departure point to a destination. The present invention also relates to determining an average fuel consumption value for each speed range of an interval based on limited fuel consumption data and to updating fuel consumption values using measured probe data.

2. Description of Related Art

For example, Japanese Patent Application Laid-Open No. 2-278116 discloses a navigation system. In the navigation system, a necessary time in each interval, a running distance, fuel consumption between intersections of the route to the destination are stored as a database in each run, and a maximum fuel consumption route is displayed from these pieces of data.

Japanese Patent Application Laid-Open No. 2005-98749 discloses a vehicle navigation system. In the vehicle navigation system, an energy consumption rate is estimated from four pieces of information. The four pieces of information include (a) static information (such as a running distance of each interval and road gradient) on the route, (b) dynamic information (such as a traffic status and a traffic signal status) on the route, (c) vehicle specifications (such as a type of a drive source and performance of the drive source), and (d) a driving characteristic of a driver.

Japanese Patent Application Laid-Open No. 2009-79995 discloses a route searching device. In the route searching device, a carbon dioxide emission amount (fuel consumption amount) of each link from the departure point to the destination is computed as the sum of a fuel consumption amount consumed in an idling state, a fuel consumption amount consumed during constant speed running, and a fuel consumption amount consumed by acceleration from a stopped state to a running state.

Japanese Patent Application Laid-Open No. 10-197272 discloses a vehicle navigation device. In the vehicle navigation device, a fuel consumption coefficient is set according to an urban road, a suburban road, or an expressway, and the fuel consumption coefficient is corrected according to a flat road, a rising gradient, or a falling gradient. An amount of fuel necessary to reach the destination is computed by the fuel consumption rate, the fuel consumption coefficient of each interval, and the running distance of each interval.

In the navigation system disclosed in Japanese Patent Application Laid-Open No. 2-278116, only the maximum fuel consumption route for the interval stored in the database can be searched, but the route cannot be searched when the vehicle runs in the interval that is not stored in the database.

In the vehicle navigation system disclosed in Japanese Patent Application Laid-Open No. 2005-98749, although the energy consumption rate is estimated from the four pieces of information, how to utilize the pieces of information to estimate the energy consumption rate is not specifically disclosed.

In the route searching device disclosed in Japanese Patent Application Laid-Open No. 2009-79995, although traffic jam information and road category are considered in computing the fuel consumption amount, how the road category reflects the computation is not specifically disclosed.

In the vehicle navigation device disclosed in Japanese Patent Application Laid-Open No. 10-197272, the set fuel consumption coefficient for the expressway is smaller than that for the urban road, and the fuel consumption coefficient is uniformly set to each interval. Therefore, the fuel consumption coefficient is not set according to the actual running state.

An object of the invention is to improve the problems of the inventions disclosed in Japanese Patent Application Laid-Open Nos. 2-278116, 2005-98749, 2009-79995, and 10-197272 to search a running route whose fuel consumption amount is minimized by accurately estimating the fuel consumption amount according to the actual running state when the vehicle runs from the departure point to the destination.

SUMMARY OF THE INVENTION

In accordance with an aspect of the invention, a route searching device that searches a vehicle running route is provided. The route searching device includes an estimated fuel consumption amount computing unit that computes an estimated fuel consumption amount of each interval constituting a plurality of routes from a departure point to a destination, and an optimum route selecting unit that selects a route in which a total of the estimated fuel consumption amount from the departure point to the destination is minimized.

The estimated fuel consumption amount computing unit includes a cruise fuel consumption amount computing unit that computes the cruise fuel consumption amount for each interval by multiplying a distance of the interval and a fuel consumption rate determined according to an average vehicle speed, a vehicle-speed fluctuation fuel consumption amount computing unit that computes the vehicle-speed fluctuation fuel consumption amount for each interval in each road category by multiplying the distance of the interval and a fuel consumption rate, the fuel consumption rate being determined from an average vehicle speed and the road category of the interval, and a gradient fuel consumption amount computing unit that computes the gradient fuel consumption amount for each interval by multiplying the distance of the interval and a fuel consumption rate determined according to a road average gradient.

The estimated fuel consumption amount is obtained by adding the cruise fuel consumption amount, the gradient fuel consumption amount, and the vehicle-speed fluctuation fuel consumption amount.

In the route searching device in accordance with the aspect of the invention, the estimated fuel consumption amount in each interval is computed while divided into the cruise fuel consumption amount, the vehicle-speed fluctuation fuel consumption amount, and the gradient fuel consumption amount, and the vehicle-speed fluctuation fuel consumption amount is computed in each road category. Accordingly, the difference of the vehicle-speed fluctuation due to the road category, which is not reflected in the conventional technique, is reflected in the computation of the estimated fuel consumption amount, so that the fuel consumption amount can be estimated with higher accuracy.

In the route searching device in accordance with the aspect of the invention, preferably the fuel consumption rate determined from the average vehicle speed and the road category of the interval for an expressway is larger than the fuel consumption rate for an urban road, and a difference of the fuel consumption rate between the urban road and the expressway increases with decreasing average vehicle speed.

Accordingly, the vehicle-speed fluctuation fuel consumption amount is computed while features of the expressway and urban road are reflected, so that the fuel consumption amount can accurately be estimated according to the actual running state.

In the route searching device in accordance with the aspect of the invention, preferably the gradient fuel consumption amount computing unit sets (i) the fuel consumption rate to a value that increases with increasing average gradient in each interval, (ii) the fuel consumption rate for the urban road smaller than that for the expressway in case of a rising gradient, and (iii) the fuel consumption rate for the urban road larger than that for the expressway in case of a falling gradient.

Accordingly, the gradient fuel consumption amount is computed while a vehicle speed pattern (fluctuation) changing according to one of the expressway and the urban road is reflected, so that the fuel consumption amount can accurately be estimated according to the actual running state.

Preferably the route searching device in accordance with the aspect of the invention further includes an air-conditioner fuel consumption amount computing unit that computes a fuel consumption amount of an air conditioner by multiplying an estimated running time in each interval and air-conditioner power consumption determined according to an ambient temperature. The estimated fuel consumption amount computing unit adds the fuel consumption amount of the air conditioner to the estimated fuel consumption amount.

Accordingly, the fuel consumption amount is estimated while the fuel consumption amount of the air-conditioner operation is added, so that the fuel consumption amount can accurately be estimated according to the actual running state (environment).

Another aspect provides a method for computing fuel consumption for a plurality of speed ranges of a route interval for a vehicle running from a departure point to a destination. The method may comprise receiving fuel consumption data from vehicle probes for a first portion of the plurality of speed ranges, wherein a second portion of the plurality of speed ranges lacks fuel consumption data; determining from the fuel consumption data of the first portion of the plurality of speed ranges, using a computer processor, a fuel consumption initial value formula and a trend line associated with the fuel consumption initial value formula; determining, using a computer processor, for each speed range of the first portion of the plurality of speed ranges, an average fuel consumption value based on the fuel consumption initial value formula and the trend line; and determining, using a computer processor, for each speed range of the second portion of the plurality of speed ranges, an average fuel consumption value based on the fuel consumption initial value formula and the trend line.

In another aspect, determining the fuel consumption initial value formula may comprise determining the fuel consumption initial value formula based on average vehicle speed, acceleration energy, and road gradient.

In another aspect, determining the fuel consumption initial value formula may comprise computing, for each speed range of the first portion, a cruise fuel consumption amount by multiplying a distance of the interval and a fuel consumption rate determined according to an average vehicle speed; computing, for each speed range of the first portion, a vehicle speed fluctuation fuel consumption amount by multiplying the distance of the interval and a fuel consumption rate, the fuel consumption rate being determined from an average vehicle speed and a road category of the interval; computing, for each speed range of the first portion, a gradient fuel consumption amount by multiplying the distance of the interval and a fuel consumption rate determined according to a road average gradient; computing, for each speed range of the first portion, an estimated fuel consumption amount by adding the cruise fuel consumption amount, the gradient fuel consumption amount, and the vehicle speed fluctuation fuel consumption amount; and determining the fuel consumption initial value formula based on the estimated fuel consumption amounts of the speed ranges of the first portion.

In another aspect, the method may further comprise updating the average fuel consumption value of a particular speed range using measured probe data subsequently received for that particular speed range.

In another aspect, the method may further comprise receiving additional fuel consumption data from vehicle probes for the plurality of speed ranges; calculating, for each speed range for which additional fuel consumption data is received, a difference between the existing average fuel consumption value and an average fuel consumption value of the additional fuel consumption data received for the each speed range; calculating a weighted average value of the differences of the speed ranges for which additional fuel consumption data is received, wherein the weighted average value comprises a gap; and shifting, for each of the speed ranges of the plurality of speed ranges, the existing average fuel consumption value by the gap to yield an updated average fuel consumption value.

In another aspect, the gap may be calculated using the formula:

$$\text{gap} = (\Sigma(\Delta d_i \times n_i))/(\Sigma n_i).$$

In another aspect, the method may further comprise, for each of the speed ranges, saving the updated average fuel consumption value and using the updated average fuel consumption value as the existing average fuel consumption value in a next iteration of the method after receiving subsequent fuel consumption data from vehicle probes for one or more speed ranges of the plurality of speed ranges.

In another aspect, the method may further comprise storing in a fuel consumption table the average fuel consumption values of the plurality of speed ranges of the interval, along with average fuel consumption values of the plurality of speed ranges for other intervals.

In another aspect, the method may further comprise selecting a route from the departure point to the destination in which a total of the average fuel consumption values of intervals of the route from the fuel consumption table is minimized.

In another aspect, each speed range of the plurality of speed ranges may span 5 mph.

Another aspect provides a method for computing fuel consumption for a plurality of speed ranges of a route interval for a vehicle running from a departure point to a destination. The method may comprise providing an existing average fuel consumption value for each speed range of the plurality of speed ranges; receiving fuel consumption data captured from vehicle probes for a first portion of the plurality of speed ranges, wherein a second portion of the plurality of speed ranges lacks captured fuel consumption data; calculating, using a computer processor, for each speed range for which fuel consumption data is received, a difference between the existing average fuel consumption value and an average fuel consumption value of the fuel consumption data received for the each speed range; calculating, using a computer processor, a weighted average value of the differences of the speed ranges for which fuel consumption data is received, wherein the weighted average value comprises a gap; and shifting, for each of the speed ranges of the plurality of speed ranges, the existing average fuel consumption value by the gap to yield an updated average fuel consumption value.

In another aspect, the gap may be calculated using the formula:

$$gap=(\Sigma(\Delta d_i \times n_i))/(\Sigma n_i).$$

In another aspect, the method may further comprise, for each of the speed ranges, saving the updated average fuel consumption value and using the updated average fuel consumption value as the existing average fuel consumption value in a next iteration of the method after receiving subsequent fuel consumption data from vehicle probes for one or more speed ranges of the plurality of speed ranges.

In another aspect, the method may further comprise storing in a fuel consumption table the updated average fuel consumption values of the plurality of speed ranges of the interval, along with average fuel consumption values of the plurality of speed ranges for other intervals.

In another aspect, the method may further comprise selecting a route from the departure point to the destination in which a total of the average fuel consumption values of intervals of the route from the fuel consumption table is minimized.

In another aspect, each speed range of the plurality of speed ranges may span 5 mph.

Another aspect provides a route searching device that computes fuel consumption for a plurality of speed ranges of possible route intervals for a vehicle running from a departure point to a destination. The route searching device may comprise an estimated fuel consumption amount computer processor that computes an estimated fuel consumption amount of each speed range of the possible route intervals, and an optimum route selecting computer processor that selects a route in which a total of the estimated fuel consumption amounts of intervals of the selected route from the departure point to the destination is minimized. For each possible route interval, the estimated fuel consumption amount computer processor may compute the estimated fuel consumption amount of each speed range by receiving fuel consumption data from vehicle probes for a first portion of the plurality of speed ranges, wherein a second portion of the plurality of speed ranges lacks fuel consumption data; determining from the fuel consumption data of the first portion of the plurality of speed ranges a fuel consumption initial value formula and a trend line associated with the fuel consumption initial value formula; determining for each speed range of the first portion of the plurality of speed ranges, an average fuel consumption value based on the fuel consumption initial value formula and the trend line; and determining for each speed range of the second portion of the plurality of speed ranges, an average fuel consumption value based on the fuel consumption initial value formula and the trend line, wherein the average fuel consumption value is the estimated fuel consumption amount.

In another aspect, the estimated fuel consumption amount computer processor may determine the fuel consumption initial value formula based on average vehicle speed, acceleration energy, and road gradient.

In another aspect, for each possible route interval, the estimated fuel consumption amount computer processor may be further configured to receive additional fuel consumption data from vehicle probes for the plurality of speed ranges; calculate, for each speed range for which additional fuel consumption data is received, a difference between the existing average fuel consumption value and an average fuel consumption value of the additional fuel consumption data received for the each speed range; calculate a weighted average value of the differences of the speed ranges for which additional fuel consumption data is received, wherein the weighted average value comprises a gap; and shift, for each of the speed ranges of the plurality of speed ranges, the existing average fuel consumption value by the gap to yield an updated average fuel consumption value.

In another aspect, the estimated fuel consumption amount computer processor may be configured to, for each of the speed ranges, save the updated average fuel consumption value and use the updated average fuel consumption value as the existing average fuel consumption value in a next iteration after receiving subsequent fuel consumption data from vehicle probes for one or more speed ranges of the plurality of speed ranges.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
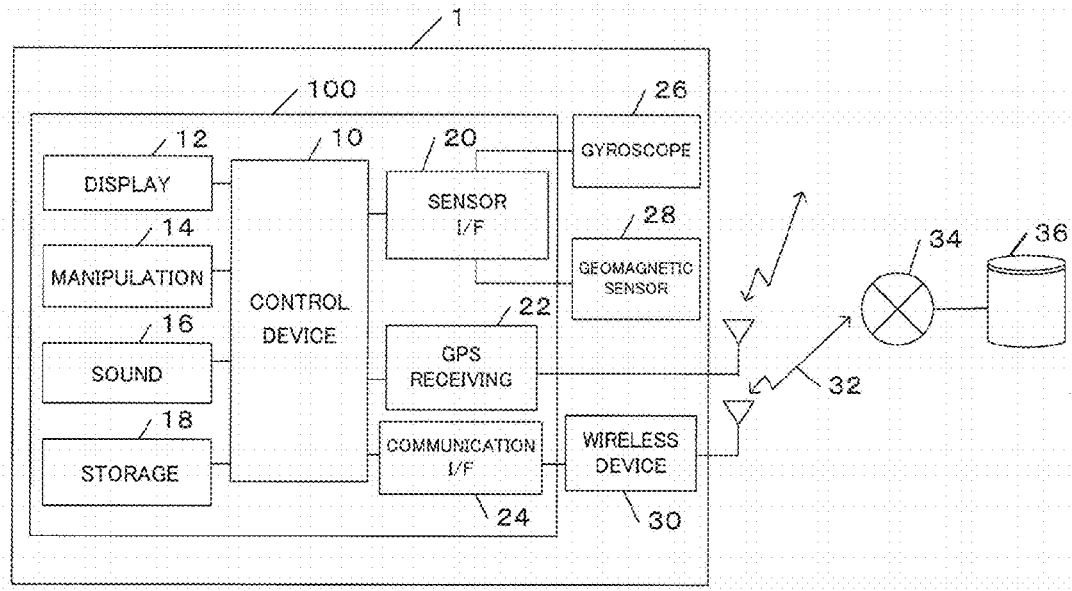
FIG. 1 is a block diagram illustrating a configuration of a route searching device according to an embodiment of the invention.

An embodiment of the invention will be described with reference to the drawings. FIG. 1 is a block diagram illustrating a configuration of a route searching device according to an embodiment of the invention.

A route searching device 100 in a vehicle 1 includes a control device 10, a display unit 12, a manipulation unit 14, a sound output unit 16, an information storage unit 18, a sensor interface (I/F) 20, a GPS receiving unit 22, and a communication interface (I/F) 24. The control device 10 is also called an Electronic Control Unit (hereinafter referred to as "ECU"), and the control device 10 is a kind of a computer including a Central Processing Unit (CPU) and a memory. The control device 10 performs various kinds of control. The detailed control device 10 is described later. The route searching device 100 may be formed as a navigation device or part of the navigation device.

The display unit 12 includes a display such as LCD. The display unit 12 can be formed by a display having a touch panel function. In such cases, part of a manipulation of the manipulation unit 14 is performed on the touch panel of the display unit 12. The manipulation unit 14 includes a button used to input information and a button used to select pieces of information displayed on the display unit 12. The sound output unit 16 includes a speaker, and the sound output unit 16 transmits guidance (instruction) from the control device 10 to a driver in the form of sound. A sound input function may be added to the sound output unit 16 in order to receive a speech-based instruction of the driver through a microphone.

The information storage unit 18 is realized by any storage unit (such as a storage medium, a semiconductor memory, and HDD). Map data necessary for the route searching is stored in the information storage unit 18. The map data includes data necessary to draw a map image on a display screen of the display unit 12. The map data also includes road data indicating information on a road connecting state. The road data includes attribute information indicating an attribute about each road. The attribute information includes information on a road category, a road shape, and a road gradient (including an average gradient).

Various parameters (including a table) necessary to compute an estimated fuel consumption amount are stored in the information storage unit 18. For example, the parameters include a fuel consumption rate that is used to compute a cruise fuel consumption amount, a vehicle-speed fluctuation fuel consumption amount, and a gradient fuel consumption amount. The parameters also include a parameter necessary to compute a fuel consumption amount of an air conditioner. The information storage unit 18 also acts as a memory in which various pieces of information received through the communication I/F 24 are stored.

In the invention, the fuel consumption amount includes not only a consumption amount of gasoline or kerosene used in an engine (internal combustion engine) but also an electric storage amount (electric power amount) of a battery used in a hybrid vehicle or an electric vehicle. Accordingly, for example, when the invention is applied to the electric vehicle, desirably the description is understood while the fuel consumption amount (rate) is replaced by a battery consumption amount (rate) or an electric power consumption amount (rate).

The sensor I/F 20 transmits a signal received from a gyroscope 26 and a geomagnetic sensor 28, which are mounted on the vehicle 1, to the control device 10. As with the GPS receiving unit 22, the gyroscope 26 and the geomagnetic sensor 28 transmit a signal for specifying a current position and an orientation of the vehicle to the control device 10. The GPS receiving unit 22 receives GPS signals including pieces of positioning data from plural GPS satellites in order to detect a vehicle absolute position from latitude and longitude information. The control device 10 computes the vehicle current position from the GPS signal.

The communication I/F 24 conducts network communication 34 or inter-vehicle communication through a wireless communication device 30 mounted on the vehicle 1. A communication network 36 is connected to information server 38 having various pieces of road information. Examples of the information server 38 include a road traffic information communication system (VICS) and an Internavi (service, provided by Honda Motor Co., Ltd., for a car navigation system user) information system. For example, information on an estimated average vehicle speed in each interval (link) is provided from VICS in addition to pieces of information on a traffic jam, construction, and a traffic restriction. For example, information of each road category and information such as a road average gradient in each interval (link) are provided from the Internavi information system. In the Internavi information system, a vehicle speed pattern of each interval can be obtained from a probe vehicle to compute an average vehicle speed of each interval. In the Internavi information system, the average vehicle speed is also stored as data in units of times of each interval or units of days of the week. In the embodiment, these pieces of data are obtained and utilized.

Figure 2:
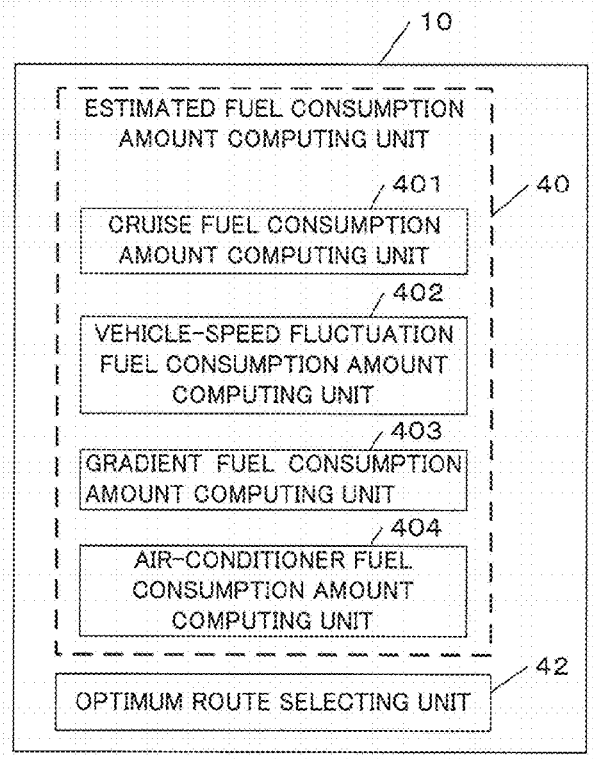
FIG. 2 is a block diagram illustrating an embodiment of a configuration of a control device of FIG. 1.

FIG. 2 is a block diagram illustrating a configuration (function) of the control device 10 of FIG. 1. The function of each block is realized by the computer (CPU) included in the control device 10. The configuration of the control device 10 may be incorporated in the navigation device.

The control device 10 includes an estimated fuel consumption amount computing unit 40 and an optimum route selecting unit 42. The estimated fuel consumption amount computing unit 40 computes the estimated fuel consumption amount of each interval constituting plural routes from a departure point to a destination when the vehicle runs from the departure point to the destination. The optimum route selecting unit 42 selects a route in which the total of estimated fuel consumption amounts from the departure point to the destination is minimized.

The estimated fuel consumption amount computing unit 40 includes a cruise fuel consumption amount computing unit 401, a vehicle-speed fluctuation fuel consumption amount computing unit 402 that computes a vehicle-speed fluctuation fuel consumption amount in each road category, a gradient fuel consumption amount computing unit 403, and an air-conditioner fuel consumption amount computing unit 404. The functions of the units 401 to 404 will be described below.

Figure 3:
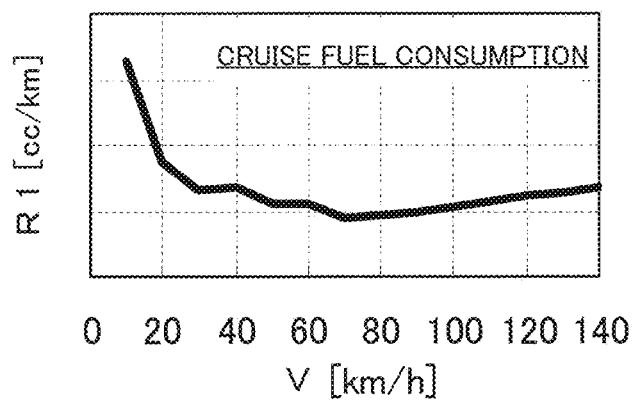
FIG. 3 is a graph that illustrates an exemplary relationship between a vehicle speed and a fuel consumption rate.

The cruise fuel consumption amount computing unit 401 computes the cruise fuel consumption amount for each interval from the departure point to the destination by multiplying a distance of the interval and a fuel consumption rate determined according to the average vehicle speed. FIG. 3 illustrates a relationship between a vehicle speed V and a fuel consumption rate R1. The relationship of FIG. 3 is previously stored as a table in the information storage unit 18.

The control device 10 (401) obtains an estimated value Vp (km/h) of the average vehicle speed of each interval from the departure point to the destination from the information server 38 through the communication I/F 24, and the control device 10 stores the estimated value Vp in the information storage unit 18. The control device 10 obtains map data stored in the information storage unit 18 or obtains a distance L (km) of each interval from the information server 38. The control device 10 reads the table expressing the relationship of FIG. 3 from the information storage unit 18, and the control device 10 obtains the fuel consumption rate R1 (cc/km) corresponding to the obtained estimated value Vp of the average vehicle speed. The control device 10 computes a cruise fuel consumption amount A (cc) of each interval from an equation (1). The obtained cruise fuel consumption amount Q1 (cc) of each interval is stored in the information storage unit 18.

$$A = R1 \times L \quad (1)$$

The vehicle-speed fluctuation fuel consumption amount computing unit 402 computes the vehicle-speed fluctuation fuel consumption amount of each road category for each interval from the departure point to the destination by multiplying the distance of the interval and a fuel consumption rate determined from the average vehicle speed and the road category of the interval. A parameter AE expressing energy changing according to a vehicle-speed fluctuation is introduced in computing the vehicle-speed fluctuation fuel consumption amount of each road category. The parameter AE expresses energy ($v^2$/km) per unit distance, which is consumed by acceleration when the vehicle makes a transition from the stopped state to the running state. The parameter AE increases when the vehicle stops intermittently due to a traffic jam or when the vehicle often repeats deceleration and acceleration.

Figure 4:
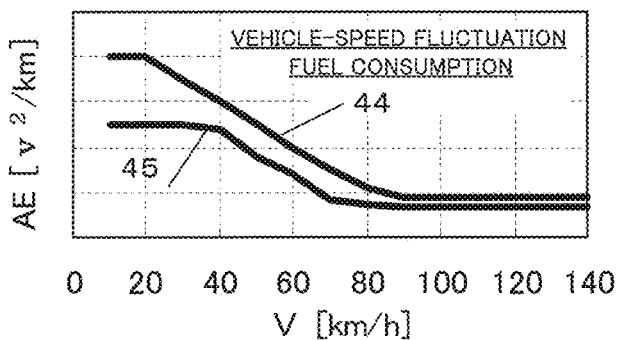
FIG. 4 is a graph that illustrates an exemplary relationship between the vehicle speed and a parameter AE of vehicle-speed fluctuation energy.

FIG. 4 illustrates a relationship between the vehicle speed V (km/h) and the parameter AE ($v^2$/km). The relationship of FIG. 4 is previously stored as a table in the information storage unit 18. A graph 44 expressing the parameter AE on the expressway and a graph 45 expressing the parameter AE on the urban road are illustrated in FIG. 4. In FIG. 4, the parameter AE (44) on the expressway is larger than the parameter AE (45) on the urban road particularly in the low-speed region. The reason is attributed to the following matter. In the vehicle run on the expressway, the low-speed region is frequently the traffic jam interval, and the driver cannot see the front of the traffic jam. Therefore, the driver accelerates the vehicle when the distance between vehicles increases, and the driver decelerates the vehicle when the distance between vehicles decreases. On the other hand, in the vehicle run on the urban road, because the driver can see the traffic signal and the like to recognize the front status, the driver does not uselessly accelerate and decelerate the vehicle, and the parameter AE decreases relatively.

The embodiment has the feature that the parameter AE whose tendency depends on the road category is utilized. That is, the fuel consumption amount is computed by using the different parameters AE according to the expressway or the urban road in each interval.

The control device 10 (402) obtains a value of the parameter AE corresponding to the already-obtained estimated value Vp (km/h) of the average vehicle speed of each interval using the relationship of FIG. 4. At this point, the road category (for example, expressway or urban road) of each interval is obtained from the map data stored in the information storage unit 18, and the relationship (for example, graph 44 or 45) of the parameter AE is selected according to the road category.

The control device 10 computes a vehicle-speed fluctuation fuel consumption rate R2 (cc/km) in each interval from an equation (2) using the parameter AE:

$$R2 = \alpha \times AE \quad (2)$$

where coefficient $\alpha$ is an arbitrary constant.

The coefficient $\alpha$ decreases when engine efficiency or transmission efficiency of the vehicle increases, and the coefficient $\alpha$ increases when a weight of the vehicle increases. In the hybrid vehicle, the coefficient $\alpha$ increases when the number of regenerations increases during the deceleration.

The vehicle-speed fluctuation fuel consumption amount B (cc) of each road category in each interval from the departure point to the destination is obtained from an equation (3) using the fuel consumption rate R2 (cc/km) and the already-obtained distance L (km) of each interval. The obtained vehicle-speed fluctuation fuel consumption amount B (cc) of each interval is stored in the information storage unit 18.

$$B = R2 \times L \quad (3)$$

The gradient fuel consumption amount computing unit 403 computes the gradient fuel consumption amount for each interval by multiplying the distance of the interval and the fuel consumption rate determined according to the road average gradient. The gradient fuel consumption amount is obtained because an influence of the presence or absence of the road gradient is reflected, that is, the fuel consumption amount changes according to a rising gradient or a falling gradient compared with the vehicle run on the flat road. The data obtained from the information server 38 such as the Internavi information system is utilized as the road average gradient of each interval.

Figure 5:
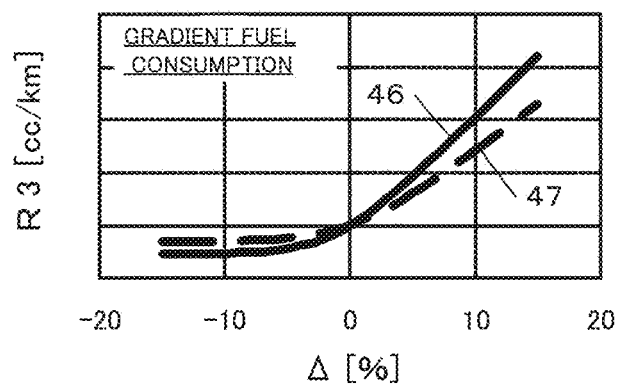
FIG. 5 is a graph that illustrates an exemplary relationship between a road gradient and the fuel consumption rate.

FIG. 5 illustrates a relationship between a road gradient Δ (%) and a fuel consumption rate R3 (cc/km). The relationship of FIG. 5 is previously stored as a table in the information storage unit 18. A graph 46 expressing the fuel consumption rate R3 on the expressway and a graph 47 expressing the fuel consumption rate R3 on the urban road are illustrated in FIG. 5. In the rising gradient (positive percent), the fuel consumption rate R3 of the expressway is larger than that of the urban road. In the falling gradient (negative percent), the fuel consumption rate R3 of the urban road is slightly larger than that of the expressway. This is attributed to the following matter. The driver is required to run in the rising gradient of the expressway while largely pressing down the accelerator to maintain the speed not lower than a constant value (for example, 80 km/h or more). On the other hand, the driver is required to run in the falling gradient of the urban road while intermittently pressing down the brake to repeat the deceleration and the acceleration in order not to excessively enhance the speed.

The embodiment has the feature that the fuel consumption rate R3 whose tendency depends on the road category is utilized. That is, the different fuel consumption rates R3 are used according to the expressway or the urban road in each interval. The control device 10 (403) obtains the fuel consumption rate R3 corresponding to the obtained road average gradient $\Delta$ (%) of each interval using the relationship of FIG. 5.

The fuel consumption rate R3 can empirically be expressed by an equation (4):

$$R3 = (a/b)\log(1 + e^{b(x-c)}) + d \qquad (4)$$

where coefficients a, b, c, and d are arbitrary constants.

The coefficient "a" is a constant that increases in mainly proportion to the vehicle weight. The coefficient "a" changes the graph of FIG. 5 such that the graph of FIG. 5 comes close to a predetermined asymptotic line in the rising gradient (positive percent), and the coefficient "a" changes the graph of FIG. 5 such that the graph of FIG. 5 comes close to zero in the falling gradient (negative percent). The coefficient "b" is a constant that increases in proportion to the vehicle acceleration. The gradient of the graph of FIG. 5 increases with increasing coefficient "b", and the gradient of the graph of FIG. 5 decreases with decreasing coefficient "b". The coefficient "c" is a constant that decreases in proportion to a vehicle running resistance. The graph of FIG. 5 is translated rightward with increasing coefficient "c". The coefficient "d" is a constant that is set to zero when the gradient is zero. That is, the coefficient "d" means an intercept that is set such that the fuel consumption rate R3(0) becomes zero.

A gradient fuel consumption amount C (cc) of each interval from the departure point to the destination is obtained from an equation (5) using the fuel consumption rate R3 (cc/km) and the already-obtained distance L (km) of each interval. The obtained vehicle-speed fluctuation fuel consumption amount C (cc) of each interval is stored in the information storage unit 18.

$$C = R3 \times L \qquad (5)$$

Figure 6:
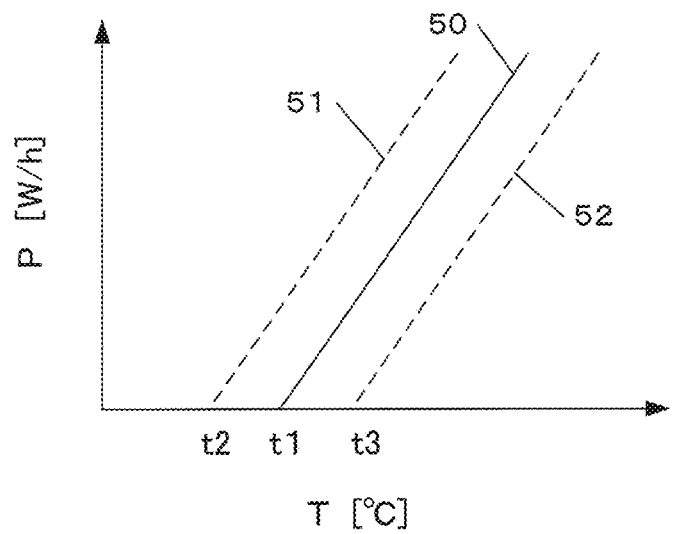
FIG. 6 is a graph that illustrates an exemplary relationship between an ambient temperature and air-conditioner power consumption.

The air-conditioner fuel consumption amount computing unit 404 computes the fuel consumption amount of the air conditioner by multiplying the air-conditioner power consumption determined according to an ambient temperature and an estimated running time in each interval. FIG. 6 illustrates a relationship between an ambient temperature T (° C.) and air-conditioner power consumption P (W/h). In FIG. 6, graphs 50, 51, and 52 expresses the air-conditioner power consumptions P (W/h) when the use of the air conditioner starts at the ambient temperature T (° C.) of t1, t2, and t3. The relationship of FIG. 6 is previously stored as a table in the information storage unit 18.

The data obtained from the information server 38 such as the Internavi information system is utilized as the ambient temperature T (° C.) of each interval. The control device 10 (404) obtains the air-conditioner power consumption P (W/h) corresponding to the ambient temperature T (° C.) of each interval using the relationship of FIG. 6. At this point, because a temperature at which the air conditioner is operated changes according to an amount of solar radiation (weather), it is considered that the relationship (graph) of FIG. 6 changes according to the amount of solar radiation (weather). For example, it is assumed that the operation of the air conditioner starts at a temperature t1 in a cloudy day, in other words, the relationship of the graph 50 is utilized. In a sunny day, on the assumption that the operation of the air conditioner starts at a temperature t2 lower than the temperature t1, the air-conditioner power consumption P (W/h) is obtained by utilizing the relationship of the graph 51. Similarly, in a rainy day, the air-conditioner power consumption P (W/h) is obtained by utilizing the relationship of the graph 53. Therefore, the air-conditioner power consumption can be estimated in consideration of the weather.

The control device 10 (404) computes an estimated value D (cc) of the fuel consumption amount by the air-conditioner operation in each interval from an equation (6):

$$D = P \times TM \times f \qquad (6)$$

where TM is an estimated running time (TM=L/Vp) obtained from the distance L (km) in each interval and the estimated average speed Vp (km/h), and "f" is a coefficient that converts the air-conditioner power consumption P (W/h) into the fuel consumption amount (cc). The estimated value D (cc) of the fuel consumption amount can be estimated in each interval from the equation (6) on the assumption that the air conditioner is fully used during the estimated running time. The obtained estimated value D (cc) of the fuel consumption amount in each interval is stored in the information storage unit 18.

The optimum route selecting unit 42 of FIG. 2 selects the route in which the total of fuel consumption amounts of the intervals from the departure point to the destination is minimized. The fuel consumption amounts of the intervals from the departure point to the destination are stored in the information storage unit 18. At this point, the minimum-cost route is selected using a concept of so-called cost. In such cases, the cost is fuel amount (cc and W). The cost may be estimated as expense (such as yen, dollar or euro) by multiplying a fuel unit price and the fuel amount (power energy). Alternatively, the fuel amount may be converted into a carbon dioxide emission amount to estimate the carbon dioxide emission amount (cc) as the cost.

Figure 7:
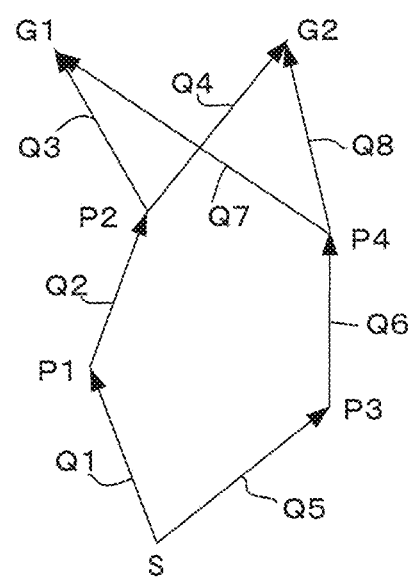
FIG. 7 is a schematic diagram of an exemplary view for explaining route selection.

FIG. 7 is a view for explaining route selection. In FIG. 7, it is assumed that the vehicle goes from a departure point S to one of two destinations G1 and G2 through the route in which the minimum fuel consumption amount is estimated. For example, the destinations G1 and G2 are points in which the similar facilities (such as a store or a park) are located. For the sake of convenience, only the intervals (links) divided by four points P1 to P4 are illustrated in FIG. 7. However, actually many passing points Pn and intervals (links) exist according to the distance to the destination.

The numerals Q1 to Q8 designate estimated fuel consumption amounts of the intervals, respectively. There are four routes from the departure point S to the destination G1 and G2, that is, a route R1 (S, P1, P2, and G1), a route R2 (S, P3, P4, and G1), a route R3 (S, P1, P2, and G2), and a route R4 (S, P3, P4, and G2). The total $\Sigma Q$ of estimated fuel consumption amounts is obtained for each route. For example, the total $\Sigma Q$ for the route R1 becomes $\Sigma Q = Q1 + Q2 + Q3$. The route in which the total $\Sigma Q$ becomes the minimum is selected. For example, when the route R3 is selected, the vehicle goes to the destination G2 through the route R3. As a result, the vehicle can go to the destination while the cost (fuel amount) is suppressed to the minimum.

When the cost is estimated as the expense (such as yen, dollar or euro), the route may be selected such that the whole expense in which a toll road fee is added to the fuel fee becomes minimum. At this point, a selection menu may be displayed on the display unit 14 in order to select the routes while a highest priority is given to one of the fuel amount, the fee, and the running time.

Figure 8:
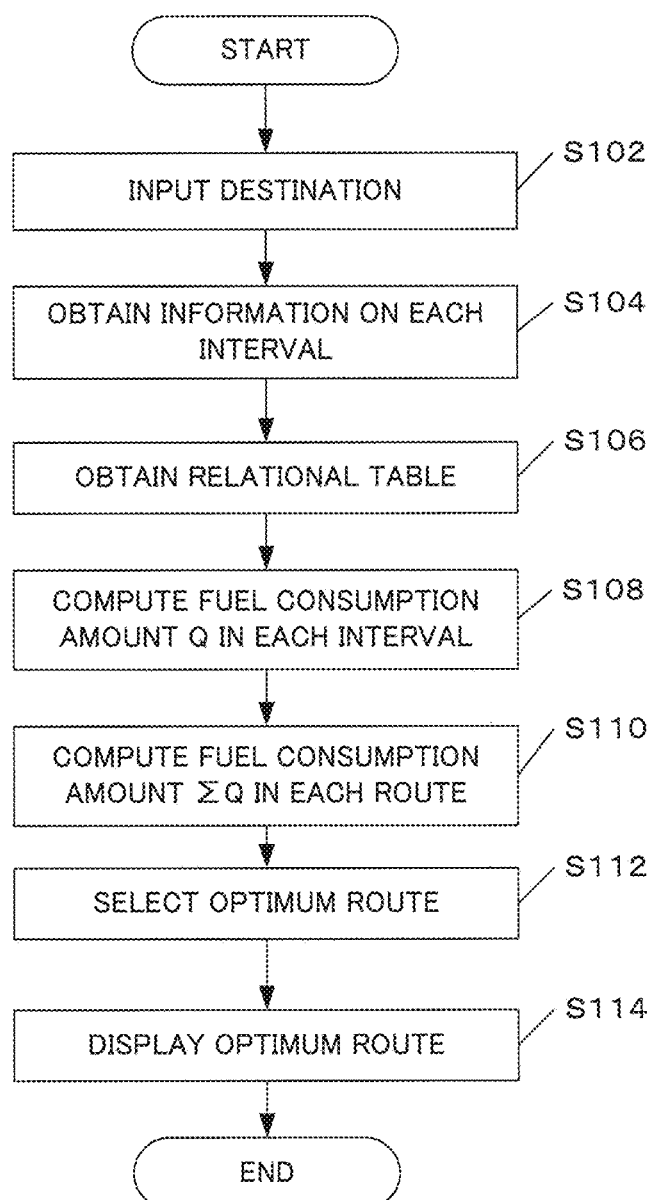
FIG. 8 is a flow chart that illustrates an embodiment of a control flow performed by a control device.

FIG. 8 illustrates a control flow performed by the control device 10 of FIG. 1. The flow of FIG. 8 is executed by CPU incorporated in the control device 10. In Step S102, the destination is inputted through the manipulation unit 14. The control device 10 obtains the map information including plural routes to the destination from the information on the vehicle current position obtained from the GPS signal. In Step S104, various pieces of information on the intervals (links) of the route from the current position to the destination are obtained. As described above, the various pieces of information include the estimated value Vp (km/h) of the average vehicle speed in each interval, the distance L (km) of each interval, the road average gradient Δ (%) of each interval, the road category of each interval, and the ambient temperature T (° C.) of each interval. Each piece of information is obtained from the information storage unit 18 or the external information server 36 according to contents.

In Step S106, the relational table is obtained in order to compute the fuel consumption amount. The relational table includes the relationships of FIGS. 3 to 6 as described above. The relationship between the ambient temperature T (° C.) and the air-conditioner power consumption P (W/h) of FIG. 6 need not to be obtained when obviously the air conditioner is not used. The relationships of FIGS. 3 to 6 may arbitrarily be selected by the manipulation unit 14.

In Step S108, the estimated value Q (=A+B+C+D) of the fuel consumption amounts of the intervals is computed and retained in the information storage unit 18. The method for computing the estimated value Q is already described. In Step S110, the total ΣQ of estimated fuel consumption amounts is computed for each route from the departure point to the destination. The method for computing the total ΣQ of estimated fuel consumption amounts is already described. In Step S112, the optimum route is selected. The optimum route is a route in which the total ΣQ of estimated fuel consumption amounts becomes the minimum. In Step S114, the optimum route is displayed as part of the map information on the display unit 12. The driver can go to the destination through the optimum route with the minimum fuel consumption amount.

The embodiment is described by way of example, and the invention is not limited to the embodiment. Various modifications can be made without departing from the scope of the invention. Basically the invention can be applied to any vehicle that can conduct wireless communication with the information server.

In the embodiment, the control device 10 computes the cruise fuel consumption amount, the vehicle-speed fluctuation fuel consumption amount, and the gradient fuel consumption amount from the average vehicle speed and the average gradient, which are obtained from the information server 36. For example, the average vehicle speed and the average gradient are previously set in the information storage unit 18 in each interval (link), and each fuel consumption amount may be computed based on the average vehicle speed and the average gradient. Alternatively, the average vehicle speed and the average gradient may be set in each interval (link) from a past running history of the vehicle.

Alternatively, the cruise fuel consumption amount, the vehicle-speed fluctuation fuel consumption amount, and the gradient fuel consumption amount are computed in the information server 36, and these pieces of information may be obtained from the information server 36. Each fuel consumption amount may be computed in the information server based on the actual average vehicle speed and the average gradient, which are obtained from a plurality of probe vehicles.

In computing fuel consumption amounts based on average vehicle speed data and average gradient data received from a plurality of probe vehicles, an embodiment provides a system and method for efficiently creating a fuel consumption table. The fuel consumption table may be stored in the information server 36, the information storage unit 18, or both.

A fuel consumption table may store data that may be used to calculate navigation routes that minimize fuel consumption. This economical routing feature may be part of the Internavi information system, described above. After a destination is selected, the economical routing feature may provide the driver with the minimum fuel consumption route to that selected destination. The fuel consumption table may be stored at the information server 36 and/or the information storage unit 18, and may include fuel consumption data for each road link by speed range. The data in the table may be calculated in real-time from probe vehicles that report fuel consumption at given speeds. When several different probe vehicles report different fuel consumption values within a given speed range, the fuel consumption value for that speed range may be calculated as the average of the reported values.

Figures 9, 10:
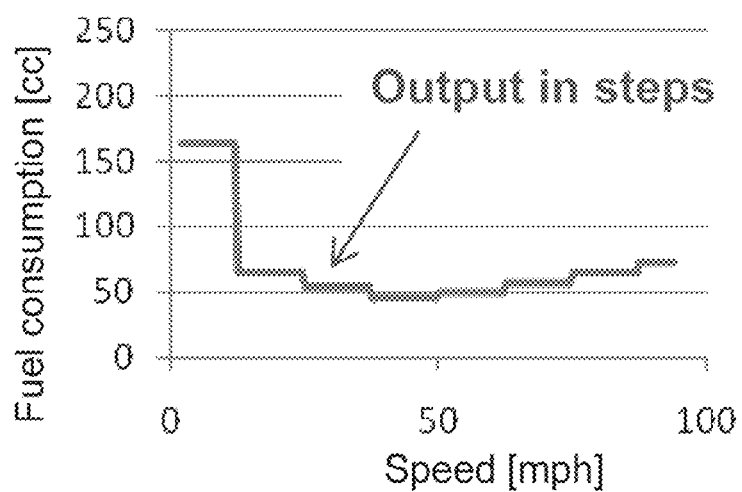
FIG. 9 is an embodiment of a fuel consumption table, which stores a fuel consumption value for each speed range of a plurality of intervals.
FIG. 10 is a graph plotting speed against fuel consumption, as an exemplary graphical representation of the fuel consumption table of FIG. 9.

FIG. 9 illustrates an example of a fuel consumption table that stores a fuel consumption value for each speed range of a plurality of intervals (links). As shown, a fuel consumption table may list fuel consumption values for each road link (e.g., Link A-N and Link A-S) at each speed range (e.g., 0-9 mph, 10-19 mph, and so on). In this example, the relatively wide speed ranges (10 mph) may cause inaccuracies in output, as exemplified by the stepped results in the graphical representation of the fuel consumption table shown in FIG. 10.

To minimize the generalizations in output and increase accuracy, embodiments may therefore use more narrow speed ranges. The narrower speed ranges may provide more granular data and may enable a smoother plot. An example of more granular data and a smoother plot, based on speed ranges of 5 mph, is shown in the exemplary fuel consumption table and graph of FIG. 11.

Figure 11:
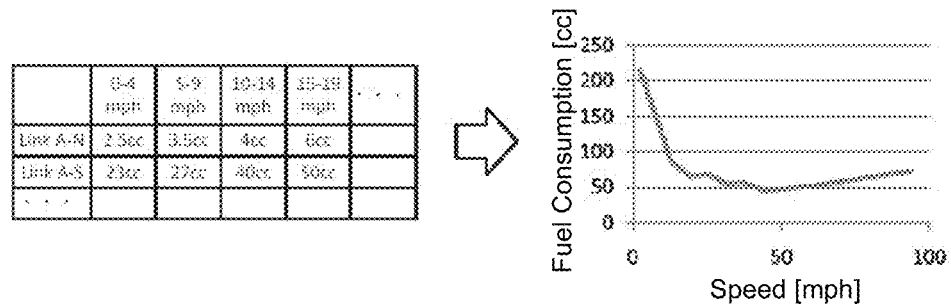
FIG. 11 is an embodiment of a fuel consumption table and a corresponding graph plotting speed against fuel consumption, using narrower speed ranges in comparison to the table of FIG. 9 and the graph of FIG. 10.
Figure 12:
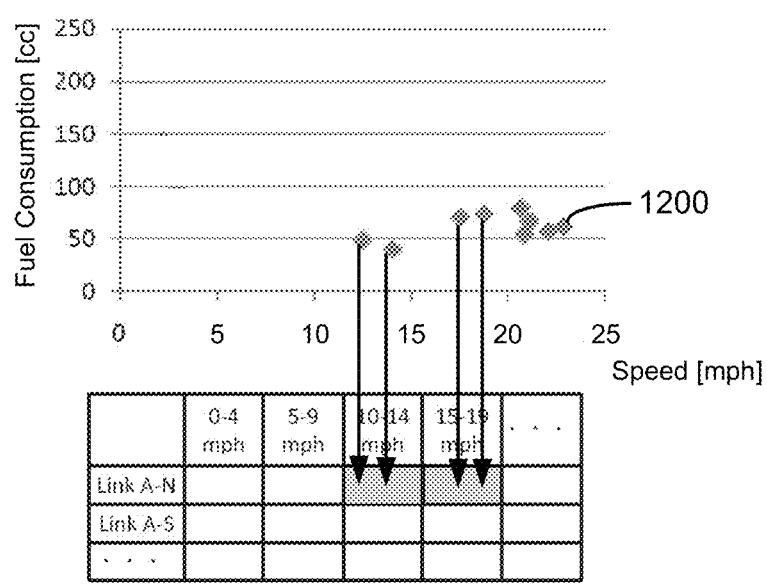
FIG. 12 illustrates an embodiment of a graph plotting speed against fuel consumption and a fuel consumption table corresponding to the graph, illustrating the time-consuming collection of probe vehicle data according to speed range, and the calculation of an average fuel consumption value for each speed range.

Using narrower speed ranges, however, may require a greater number of fuel consumption values, as evident from the table of FIG. 11. In other words, there may be more fuel consumption values to fill out in the table. Since each of these values may be derived from probe vehicle data, more probe vehicle samples may be needed to fill up the table. Indeed, at a minimum, one probe vehicle value may be needed for each speed range on each road link. As a result, more time may be required to populate the table when the speed ranges are narrower. As an example, the graph and table of FIG. 12 illustrate the time-consuming collection of probe vehicle data according to speed range, and the calculation of an average fuel consumption value for each speed range. The horizontal gaps between data points 1200 on the graph show a lack of probe vehicle data for certain speed ranges, resulting in empty data fields in the table, such as in the speed range fields for 0-4 mph and 5-9 mph.

To more efficiently create a fuel consumption table having narrower speed ranges, an embodiment extrapolates fuel consumption values for each speed range from limited probe vehicle data. In one implementation, a method may use an approximation formula based on the probe vehicle data, and then calculate all of the fuel consumption values in the table. The method may create a trend line in coordinate space of speed and fuel consumption by using the captured probe vehicle data. Then, the method may calculate each fuel consumption value of the table using the trend line. Because a continuity assumption is effective in predicting the relationship between speed and fuel consumption, the trend line may cover a speed range for which no probe vehicle data exists.

Figure 13:
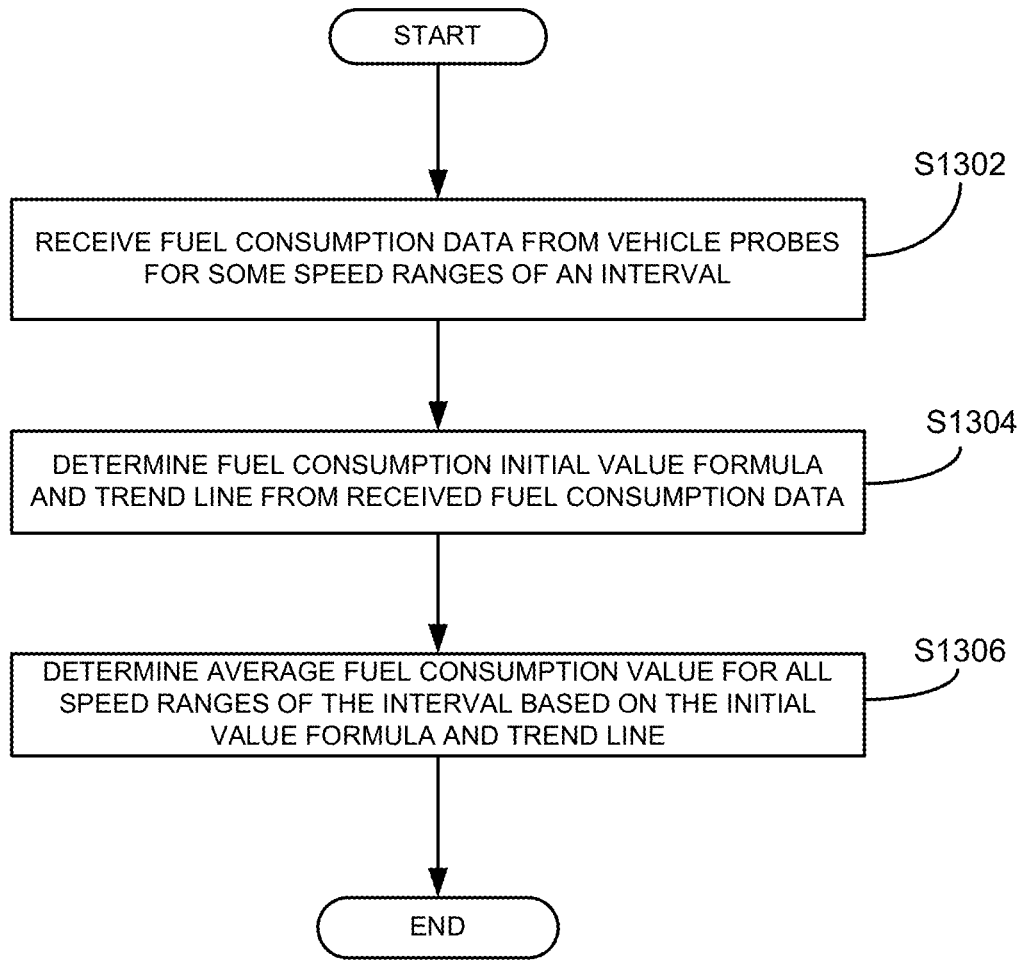
FIG. 13 is a flowchart that illustrates an embodiment of a method for determining an average fuel consumption value for each speed range of an interval.

FIG. 13 illustrates an embodiment of a method for determining an average fuel consumption value for each speed range of an interval, using vehicle probe data received for only a portion of the speed ranges. As shown, in step S1302, the method may begin by receiving fuel consumption data from vehicle probes for some speed ranges of an interval. Fuel consumption data may not be received for the remaining speed ranges of the interval. In step S1304, the method may continue by determining a fuel consumption initial value formula and trend line from the received fuel consumption data. Then, in step S1306, the method may determine, based on the initial value formula and trend line, an average fuel consumption value for all speed ranges, whether or not fuel consumption data has been received for all of the speed ranges.

Figure 14:
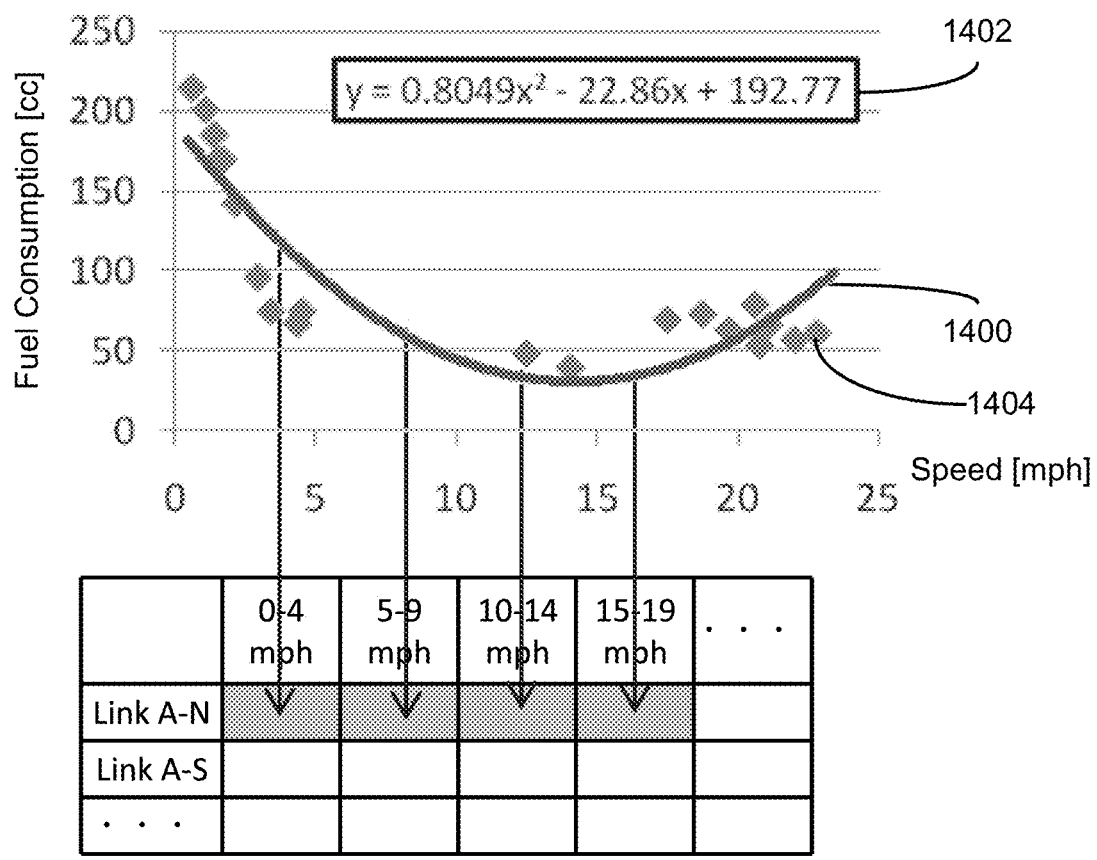
FIG. 14 is an embodiment of a graph plotting speed against fuel consumption and a fuel consumption table corresponding to the graph, illustrating the use of a fuel consumption initial value formula as an approximation formula, from which fuel consumption for each speed range on a given road link may be calculated.

As an example of the method of FIG. 13, the graph and table of FIG. 14 illustrate an embodiment of the use of a trend line 1400 and corresponding fuel consumption initial value formula 1402 for determining fuel consumption values. The trend line 1400 and corresponding fuel consumption initial value formula 1402 are derived from captured probe vehicle data 1404. The fuel consumption initial value formula 1402 is used as an approximation formula (e.g., here, a second order polynomial), from which fuel consumption for each speed range on a given road link may be calculated, including speed ranges for which no probe data has been collected (e.g., speed range 5-9 mph in FIG. 14). As an example, in one embodiment, the fuel consumption initial value formula 1402 may yield values having an accuracy of 85% in comparison to actual fuel consumption. The fuel consumption initial value formula 1402 may be developed as described above in reference to FIGS. 3-5. For example, the fuel consumption initial value formula 1402 may be calculated based on the three factors of average vehicle speed (see, e.g., FIG. 3), acceleration energy (see, e.g., FIG. 4), and road gradient (see, e.g., FIG. 5).

Thus, this embodiment may efficiently populate an economical routing fuel consumption table by extrapolating fuel consumption values for specific speed ranges within the table based on limited probe vehicle data.

Another aspect applies a correction algorithm to update fuel consumption table values using measured probe data. One embodiment provides a method that efficiently populates an economical routing fuel consumption table by determining a difference or gap D between existing fuel consumption data and captured probe vehicle fuel consumption data, and applying that gap D to the existing fuel consumption data of all speed ranges, including speed ranges for which no probe vehicle fuel consumption data has been captured. The method may begin by calculating an average value of probe vehicle data in each speed range. Then, differences between the average value of the probe vehicle data and the existing value of the fuel consumption table may be calculated for each speed range. Each difference may be expressed, for example, as Δ0-5 mph, Δ5-10 mph, Δ10-15 mph, etc. A weighted average value of the differences (e.g., Δ0-5 mph, Δ5-10 mph, Δ10-15 mph, etc.) may then be calculated, with the resulting value being the gap D. The existing value in each speed range may then be shifted by the applicable gap D.

Figure 15:
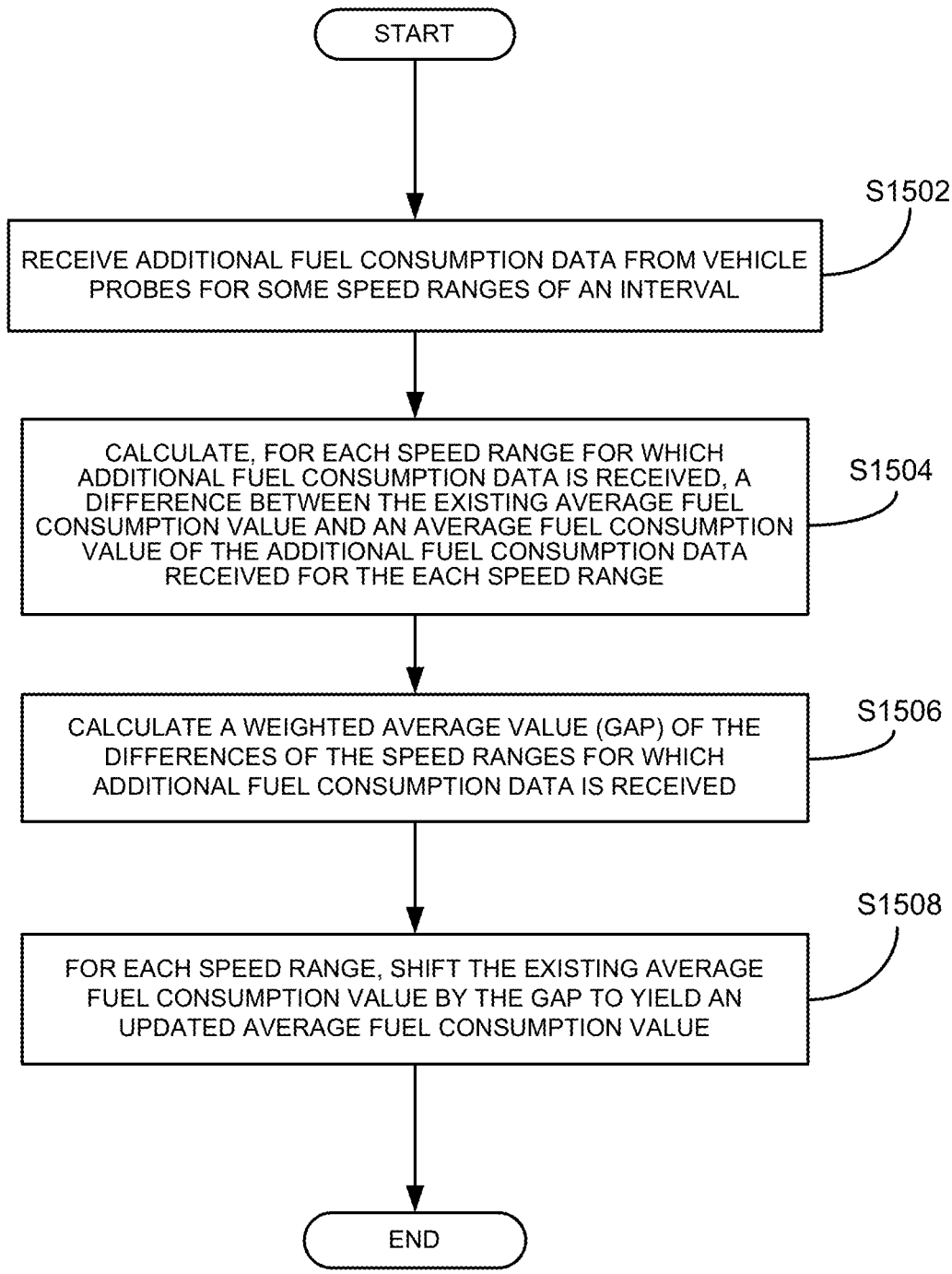
FIG. 15 is a flowchart that illustrates an embodiment of a method for updating fuel consumption values using measured probe data.

FIG. 15 illustrates an embodiment of a method for updating fuel consumption values using measured probe data. As shown, in step S1502, the method begins by receiving additional fuel consumption data from vehicle probes for some speed ranges of an interval. Additional fuel consumption data may not be received for the remaining speed ranges of the interval. After receiving the additional fuel consumption data, the method may continue in step S1504 by calculating, for each speed range for which additional fuel consumption data was received, a difference between the existing average fuel consumption value and an average fuel consumption value of the additional fuel consumption data received for the each speed range. Then, in step S1506, the method may continue by calculating a weighted average value of the differences of the speed ranges for which additional fuel consumption data was received. That weighted average value may be referred to as a gap. With the gap calculated, the method may then conclude in step S1508 by shifting, for each speed range, the existing average fuel consumption value by the gap to yield an updated average fuel consumption value.

Figure 16:
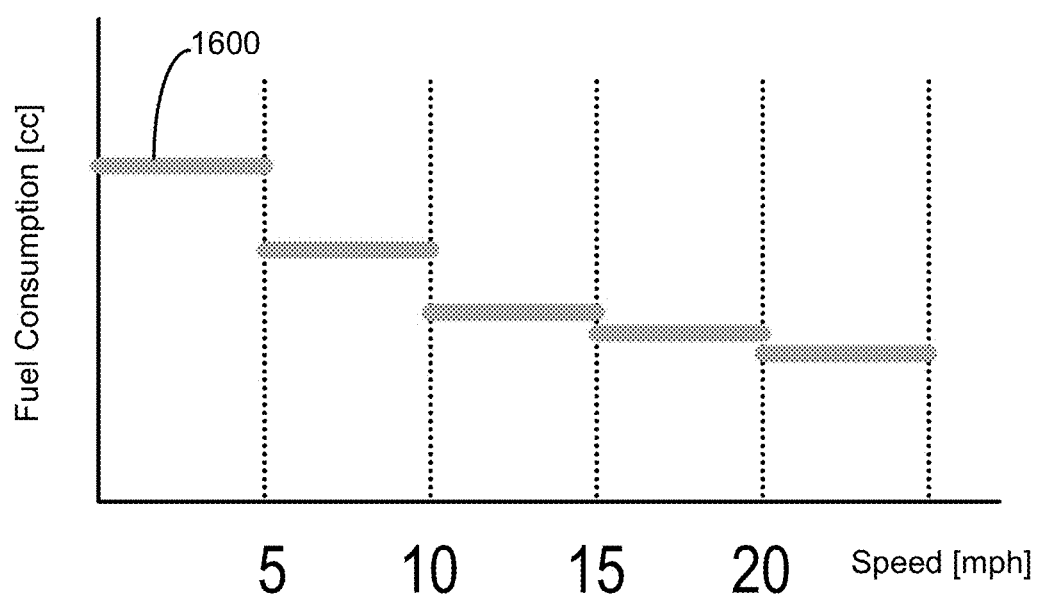
FIG. 16 is a graph plotting speed against fuel consumption, illustrating exemplary calculated initial average fuel consumption values for each given speed range.
Figure 17:
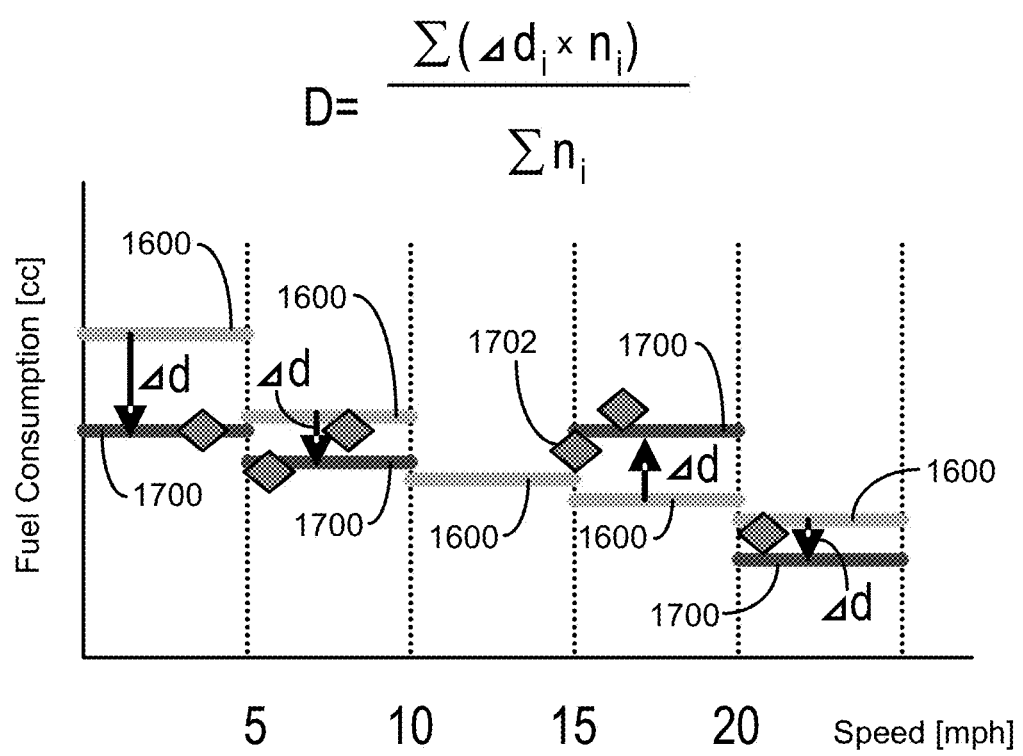
FIG. 17 is a graph plotting speed against fuel consumption, which illustrates the exemplary calculated initial average fuel consumption values of FIG. 16, and for each speed range having probe vehicle date, an exemplary difference Δd between the initial average fuel consumption value and the received probe vehicle average fuel consumption value.
Figure 18:
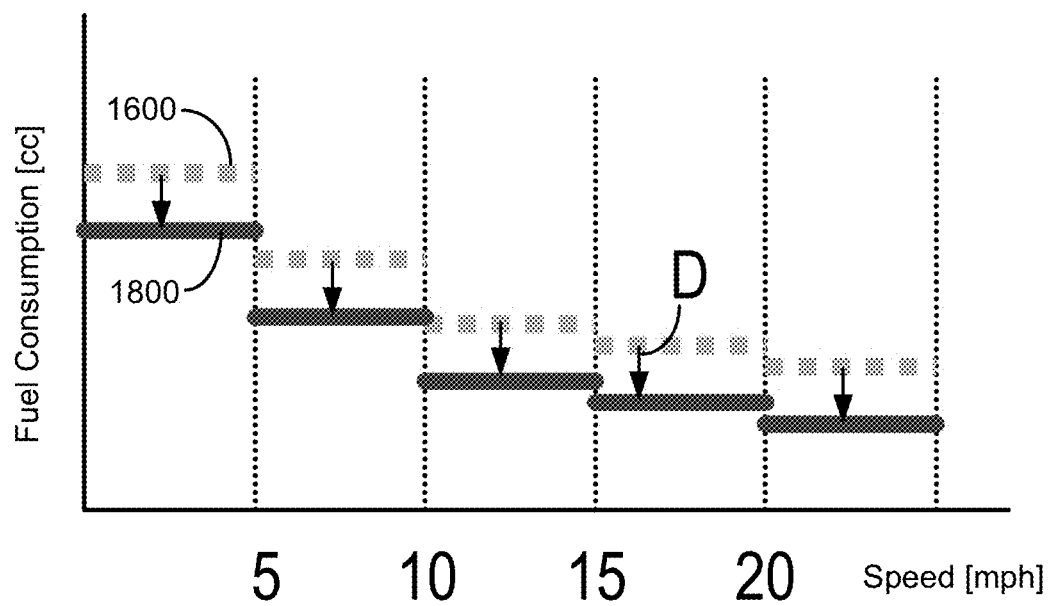
FIG. 18 is a graph plotting speed against fuel consumption, which illustrates an exemplary application of the total gap D to the initial average fuel consumption values of all of the speed ranges.

As an example of the method of FIG. 15, the graphs of FIGS. 16-18 illustrate an embodiment for calculating and applying a gap D. As shown in FIG. 16, the method begins by calculating an initial average fuel consumption value 1600 for each given speed range. These initial average fuel consumption values may be calculated using algorithms as discussed above in reference to FIG. 14, such as fuel consumption initial value formula 1402. FIG. 16 illustrates the calculated average fuel consumption values 1600 for each given speed range, i.e., 0-5 mph, 5-10 mph, 10-15 mph, 15-20 mph, and so on.

Having determined the initial average fuel consumption values 1600, the method may continue by processing received probe vehicle data. As shown in FIG. 17, for example, the method may calculate, for each speed range having probe vehicle data, the difference Δd between the initial average fuel consumption value 1600 and the received probe vehicle average fuel consumption value 1700. In other words, for each speed range of a given road link, the received probe vehicle fuel consumption values 1702 may be averaged, and that average fuel consumption value 1700 may be compared to the initial average fuel consumption value 1600 to determine the difference Δd for that speed range. With all of the available differences Δd calculated, the total gap D may then be calculated as an average of all of the calculated differences Δd. For example, as shown in FIG. 17, the total gap D may be calculated using the following formula (7):

$$D = (\Sigma(\Delta d_i \times n_i))/(\Sigma n_i) \qquad (7)$$

In formula (7), "d" denotes speed range, "i" denotes the sequential number of a speed range, and "n" denotes a number associated with the speed range, such as a number of samples associated with a speed range. For example, referring to FIG. 17, $\Delta d_1$ may correspond to the Δd of the speed range 0-5 mph, $\Delta d_2$ may correspond to the Δd of the speed range 5-10 mph, $\Delta d_3$ may correspond to the Δd of the speed range 15-20 mph, and $\Delta d_4$ may correspond to the Δd of the speed range 20-25 mph. The $n_i$ provides the weighting described above in reference to the method of FIG. 15. As one possibility for the weighting, in reference to FIG. 17, the $n_i$ may denote the number of received probe vehicle fuel consumption values 1702 averaged to determine the average fuel consumption value 1700. For example, as shown in FIG. 17, $n_1$ may correspond to 1 sample, $n_2$ may correspond to 2 samples, $n_3$ may correspond to 2 samples, and $n_4$ may correspond to 1 sample. In turn, applying formula (7) to the example of FIG. 17 would yield the following:

$$D = \frac{(\Delta d_1 \times 1_1) + (\Delta d_2 \times 2_2) + (\Delta d_3 \times 2_3) + (\Delta d_4 \times 1_4)}{1_1 + 2_2 + 2_3 + 1_4}$$

Having calculated the total gap D, the method may continue by applying the total gap D to the initial average fuel consumption values 1600 of all of the speed ranges, including speed ranges for which no probe vehicle data has been received. As an example, FIG. 18 illustrates the initial average fuel consumption values 1600 (shown as dashed lines) for each speed range decreased by the calculated total gap D to yield the updated average fuel consumption values 1800 for each speed range. The updated average fuel consumption values 1800 may then be saved and used as the initial values in a next iteration of the method after additional probe vehicle data has been received. The method may then continue to repeat as additional probe vehicle data is received, each time becoming more accurate based on the data gathered from actual driving conditions.

Figure 19:
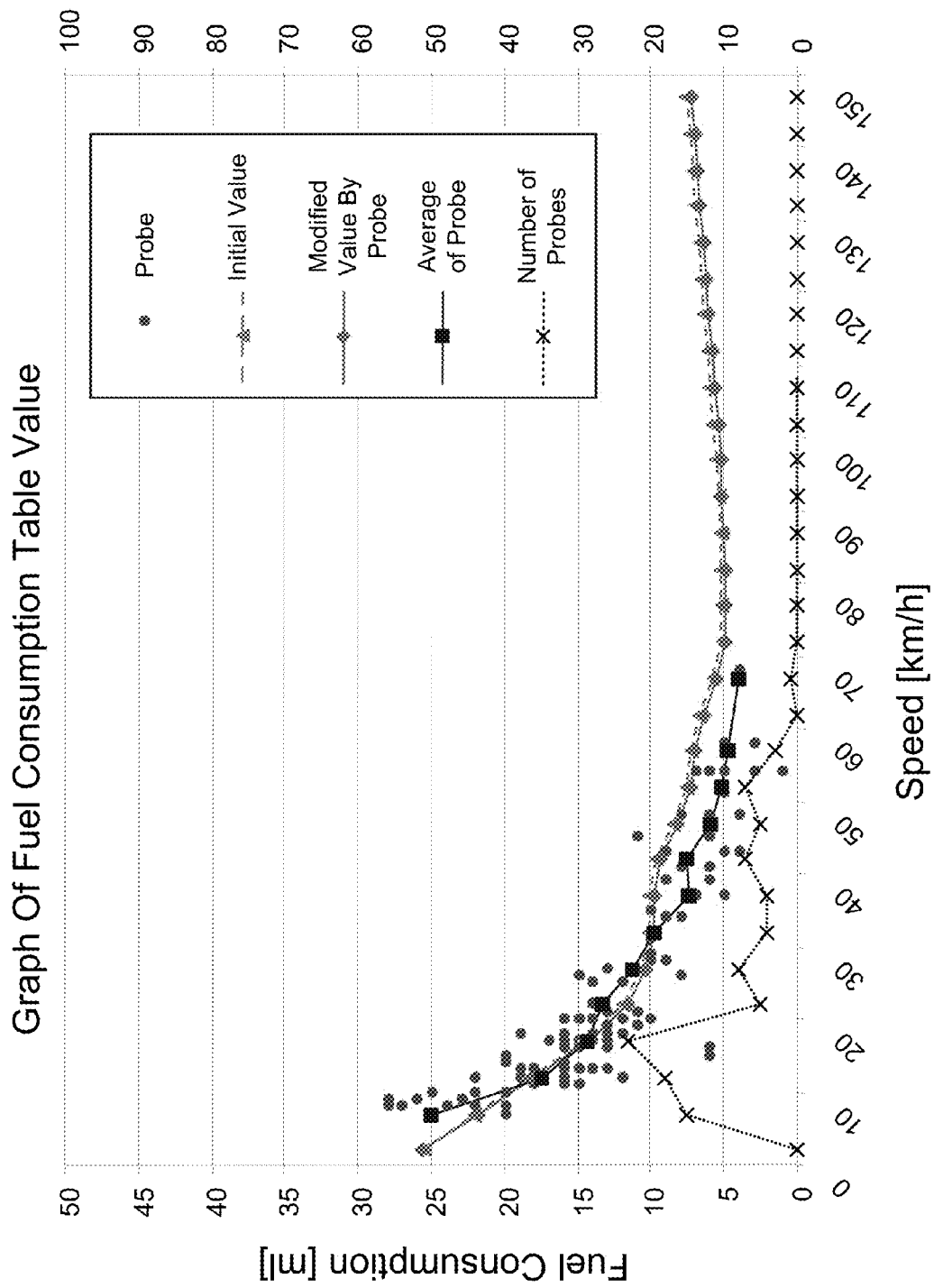
FIGS. 19-21 are graphs plotting speed against fuel consumption, illustrating exemplary graphical representations of fuel consumption tables for three different sets of vehicle probe data.
Figure 20:
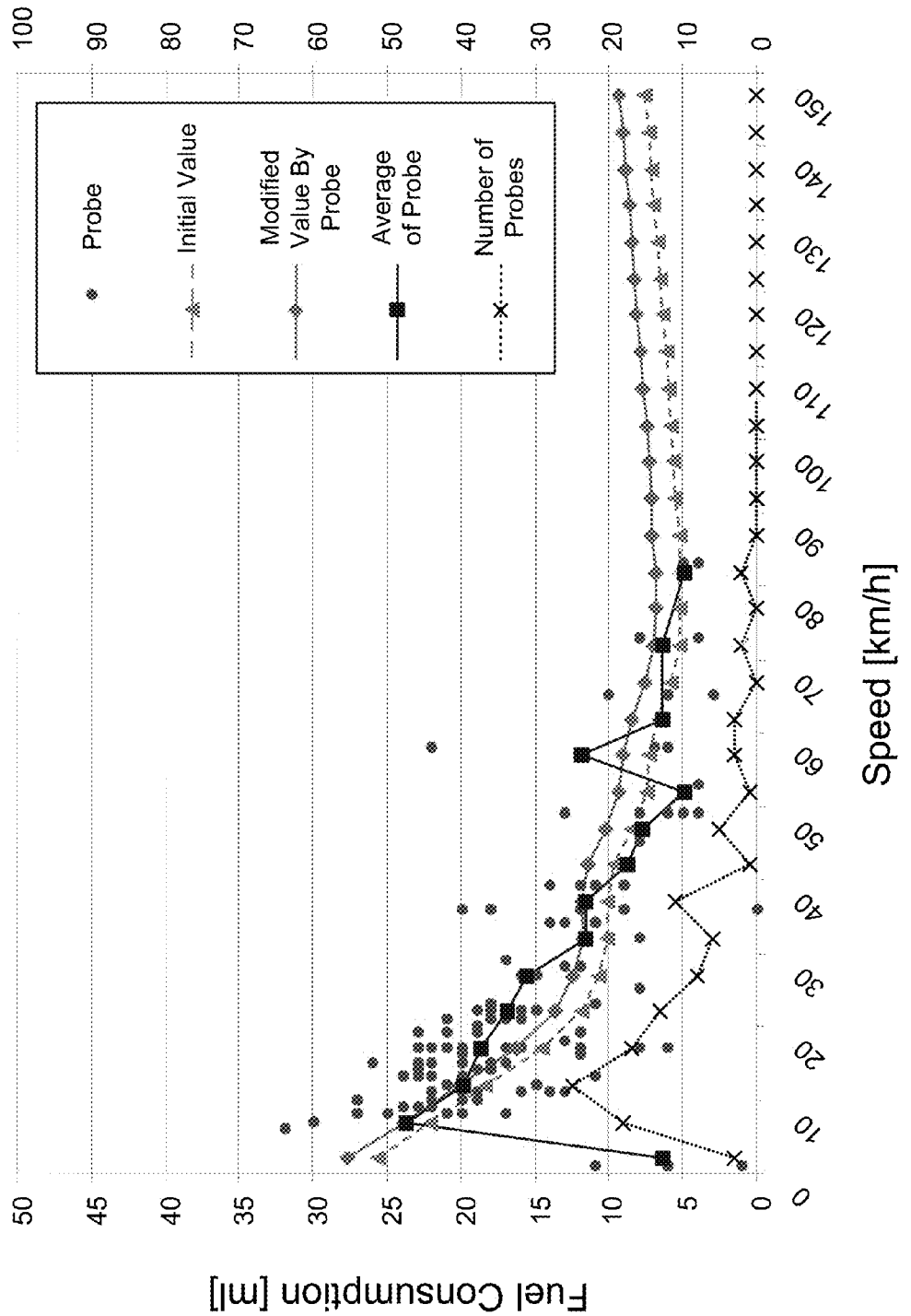
Figure 21:
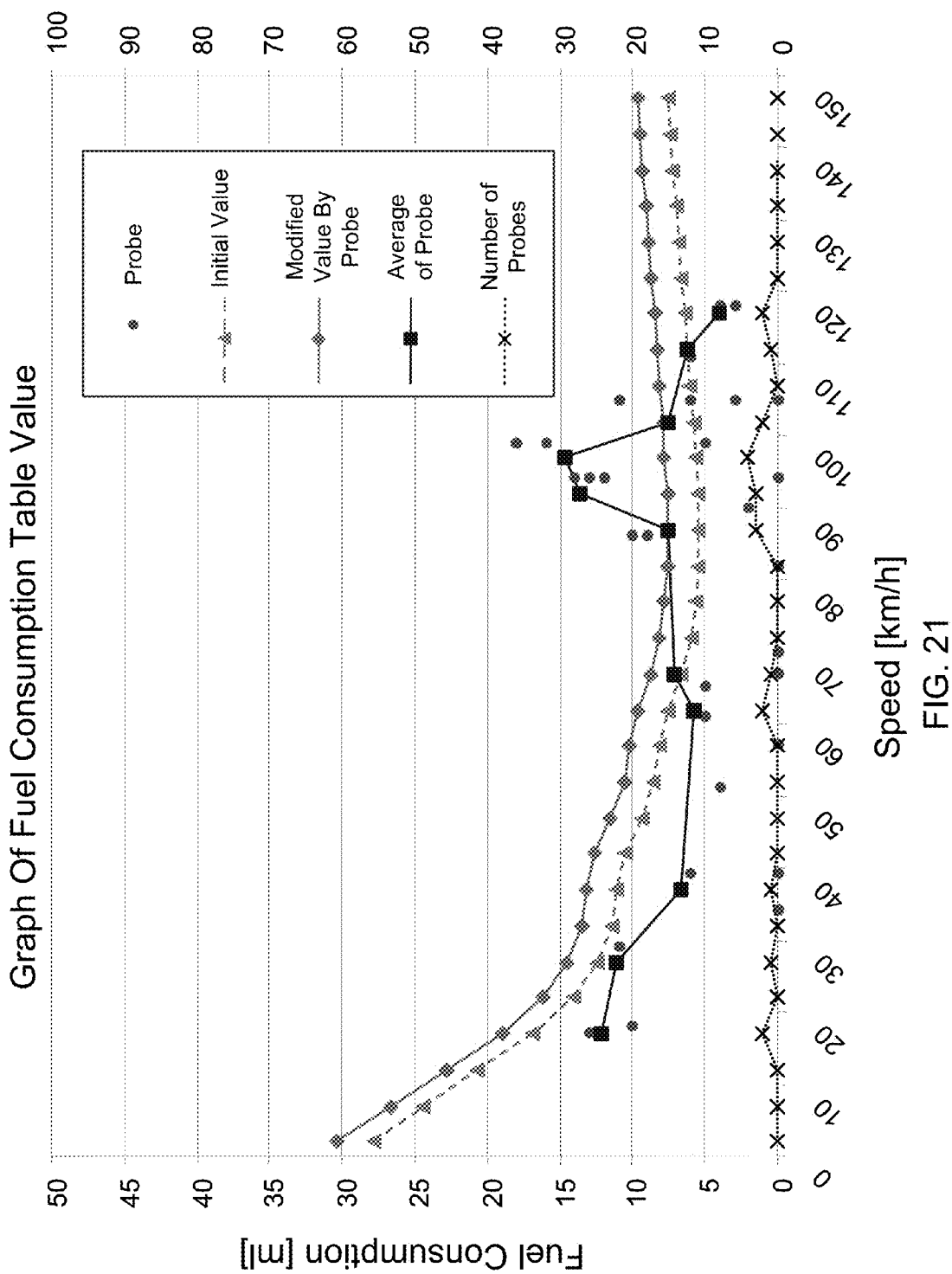

FIGS. 19-21 illustrate examples of graphical representations of fuel consumption tables for three different sets of vehicle probe data, and how the vehicle probe data is used to update the values yielded by the initial value formula. As shown, the vehicle probe data is represented by the individual dots, the data of the initial value formula is represented by the triangles connected by a dashed line, the value as modified by the vehicle probe data is represented by the diamonds connected by a solid line, the average of the vehicle probe data is represented by the squares connected by a solid line, and the number of vehicle probe data points is represented by the X-marks connected by a dotted line.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for computing fuel consumption for a plurality of speed ranges of a route interval for a vehicle running from a departure point to a destination and for displaying a minimum fuel consumption route from the departure point to the destination, the method comprising:
    receiving actual fuel consumption data reported by a plurality of probe vehicles for a first portion of the plurality of speed ranges, wherein a second portion of the plurality of speed ranges lacks actual fuel consumption data;
    determining from the actual fuel consumption data of the first portion of the plurality of speed ranges, using a computer processor, a fuel consumption initial value formula and a trend line associated with the fuel consumption initial value formula;
    determining, using a computer processor, for each speed range of the first portion of the plurality of speed ranges, an average fuel consumption value based on the fuel consumption initial value formula and the trend line;
    determining, using a computer processor, for each speed range of the second portion of the plurality of speed ranges, an average fuel consumption value based on the fuel consumption initial value formula and the trend line;
    determining the minimum fuel consumption route using the average fuel consumption values of the first and second portions of the plurality of speed ranges; and
    displaying on a computer display unit the minimum fuel consumption route.

2. The method of claim 1, wherein determining the fuel consumption initial value formula comprises determining the fuel consumption initial value formula based on average vehicle speed, acceleration energy, and road gradient.

3. The method of claim 1, wherein determining the fuel consumption initial value formula comprises:
    computing, for each speed range of the first portion, a cruise fuel consumption amount by multiplying a distance of the interval and a fuel consumption rate determined according to an average vehicle speed;
    computing, for each speed range of the first portion, a vehicle speed fluctuation fuel consumption amount based on the distance of the interval and an energy consumption rate for a road category of the interval, wherein the energy consumption rate is determined based on the average vehicle speed and the road category of the interval by using predetermined data indicating an energy consumption per unit distance as a function of an average vehicle speed for each road category;
    computing, for each speed range of the first portion, a gradient fuel consumption amount by multiplying the distance of the interval and a gradient fuel consumption rate determined based on a road average gradient and the road category of the interval by using data indicating the gradient fuel consumption rate as a function of the road average gradient for each road category;
    computing, for each speed range of the first portion, an estimated fuel consumption amount by adding the cruise fuel consumption amount, the gradient fuel consumption amount, and the vehicle speed fluctuation fuel consumption amount; and
    determining the fuel consumption initial value formula based on the estimated fuel consumption amounts of the speed ranges of the first portion.

4. The method of claim 1, further comprising updating the average fuel consumption value of a particular speed range using measured probe data subsequently received for that particular speed range.

5. The method of claim 1, wherein the actual fuel consumption data is a first set of fuel consumption data,
    wherein, for each speed range of the first and second portions of the plurality of speed ranges, the average fuel consumption value is an existing average fuel consumption value, and
    wherein after determining the existing average fuel consumption for each speed range of the first and second portions of the plurality of speed ranges based on the first set of fuel consumption data, the method further comprises:

receiving additional actual fuel consumption data captured by a plurality of probe vehicles for the plurality of speed ranges;

calculating, for each speed range for which additional actual fuel consumption data is received, a difference between the existing average fuel consumption value and an average fuel consumption value of the additional actual fuel consumption data received for the each speed range;

calculating a weighted average value of the differences of the speed ranges for which additional actual fuel consumption data is received; and shifting, for each of the speed ranges of the plurality of speed ranges, the existing average fuel consumption value by the weighted average value to yield an updated average fuel consumption value.

6. The method of claim 5, wherein the weighted average value is calculated using the formula: weighted average value=$(\Sigma(\Delta d_i \times n_i))/(\Sigma n_i)$, wherein d denotes speed range, i denotes a sequential number of a speed range, and n denotes a number of received robe vehicle fuel consumption values averaged to determine the existing average fuel consumption value.

7. The method of claim 5, further comprising, for each of the speed ranges, saving the updated average fuel consumption value and using the updated average fuel consumption value as the existing average fuel consumption value in a next iteration of the method after receiving subsequent actual fuel consumption data captured by a plurality of probe vehicles for one or more speed ranges of the plurality of speed ranges.

8. The method of claim 5, further comprising storing in a fuel consumption table the updated average fuel consumption values of the plurality of speed ranges of the interval, along with average fuel consumption values of the plurality of speed ranges for other intervals.

9. The method of claim 8, wherein determining the minimum fuel consumption route comprises selecting a route from the departure point to the destination in which a total of the average fuel consumption values of intervals of the route from the fuel consumption table is minimized.

10. The method of claim 1, wherein each speed range of the plurality of speed ranges spans 5 mph.

11. A method for computing fuel consumption for a plurality of speed ranges of a route interval for a vehicle running from a departure point to a destination and for displaying a minimum fuel consumption route from the departure point to the destination, the method comprising:

determining an existing average fuel consumption value for each speed range of the plurality of speed ranges;

after determining the existing average fuel consumption value for each speed range of the plurality of speed ranges, receiving actual fuel consumption data captured by a plurality of probe vehicles for a first portion of the plurality of speed ranges, wherein a second portion of the plurality of speed ranges lacks captured actual fuel consumption data;

calculating, using a computer processor, for each speed range for which actual fuel consumption data is received, a difference between the existing average fuel consumption value and an average fuel consumption value of the actual fuel consumption data received for the each speed range;

calculating, using a computer processor, a weighted average value of the differences of the speed ranges for which actual fuel consumption data is received;

shifting, for each of the speed ranges of the first portion and the second portion of the plurality of speed ranges, the existing average fuel consumption value by the weighted average value to yield an updated average fuel consumption value; and determining the minimum fuel consumption route using the updated average fuel consumption values of the first and second portions of the plurality of speed ranges; and displaying on a computer display unit the minimum fuel consumption route.

12. The method of claim 11, wherein the weighted average value is calculated using the formula: weighted average value=$(\Sigma(\Delta d_i \times n_i))/(\Sigma n_i)$, wherein d denotes speed range, i denotes a sequential number of a speed range, and n denotes a number of received probe vehicle fuel consumption values averaged to determine the existing average fuel consumption value.

13. The method of claim 11, further comprising, for each of the speed ranges, saving the updated average fuel consumption value and using the updated average fuel consumption value as the existing average fuel consumption value in a next iteration of the method after receiving subsequent actual fuel consumption data captured by a plurality of probe vehicles for one or more speed ranges of the plurality of speed ranges.

14. The method of claim 11, further comprising storing in a fuel consumption table the updated average fuel consumption values of the plurality of speed ranges of the interval, along with average fuel consumption values of the plurality of speed ranges for other intervals.

15. The method of claim 14, wherein determining the minimum fuel consumption route comprises selecting a route from the departure point to the destination in which a total of the average fuel consumption values of intervals of the route from the fuel consumption table is minimized.

16. The method of claim 11, wherein each speed range of the plurality of speed ranges spans 5 mph.

17. A route searching device that computes fuel consumption for a plurality of speed ranges of possible route intervals for a vehicle running from a departure point to a destination, the route searching device comprising:

an estimated fuel consumption amount computer processor that computes an estimated fuel consumption amount of each speed range of the possible route intervals; and an optimum route selecting computer processor that selects a route in which a total of the estimated fuel consumption amounts of intervals of the selected route from the departure point to the destination is minimized, wherein, for each possible route interval, the estimated fuel consumption amount computer processor computes the estimated fuel consumption amount of each speed range by:

receiving actual fuel consumption data reported by a plurality of probe vehicles for a first portion of the plurality of speed ranges, wherein a second portion of the plurality of speed ranges lacks actual fuel consumption data;

determining from the actual fuel consumption data of the first portion of the plurality of speed ranges a fuel consumption initial value formula and a trend line associated with the fuel consumption initial value formula;

determining for each speed range of the first portion of the plurality of speed ranges, an average fuel consumption value based on the fuel consumption initial value formula and the trend line; and determining for each speed range of the second portion of the plurality of speed ranges, an average fuel consumption value based on the fuel consumption initial value formula and the trend line, wherein the average fuel consumption value is the estimated fuel consumption amount; and a display unit that receives the selected route from the optimum route selecting computer processor and displays the selected route.

18. The route searching device of claim 17, wherein the estimated fuel consumption amount computer processor determines the fuel consumption initial value formula based on average vehicle speed, acceleration energy, and road gradient.

19. The route searching device of claim 17, wherein the fuel consumption data is a first set of fuel consumption data, wherein, for each speed range of the first and second portions of the plurality of speed ranges, the average fuel consumption value is an existing average fuel consumption value, and wherein, for each possible route interval, after determining the existing average fuel consumption for each speed range of the first and second portions of the plurality of speed ranges based on the first set of fuel consumption data, the estimated fuel consumption amount computer processor is further configured to:

receive additional actual fuel consumption data captured by a plurality of probe vehicles for the plurality of speed ranges;

calculate, for each speed range for which additional actual fuel consumption data is received, a difference between the existing average fuel consumption value and an average fuel consumption value of the additional actual fuel consumption data received for the each speed range;

calculate a weighted average value of the differences of the speed ranges for which additional actual fuel consumption data is received; and shift, for each of the speed ranges of the plurality of speed ranges, the existing average fuel consumption value by the weighted average value to yield an updated average fuel consumption value.

20. The route searching device of claim 19, wherein the estimated fuel consumption amount computer processor is configured to, for each of the speed ranges, save the updated average fuel consumption value and use the updated average fuel consumption value as the existing average fuel consumption value in a next iteration after receiving subsequent actual fuel consumption data captured by a plurality of probe vehicles for one or more speed ranges of the plurality of speed ranges.

21. The method of claim 1, wherein determining the average fuel consumption values comprises populating a fuel consumption database table with the average fuel consumption values of the plurality of speed ranges of the route interval, along with average fuel consumption values of the plurality of speed ranges for other intervals.

22. The method of claim 1, further comprising minimizing fuel consumption of the vehicle by providing to a driver of the vehicle instructions for following the minimum fuel consumption route.

23. The method of claim 1, wherein the average fuel consumption values of the first and second portions of the plurality of speed ranges are determined in real-time from the actual fuel consumption data reported by the plurality of probe vehicles.

* * * * *